H. A. W. KLINKHAMER.
RESISTANCE MEASUREMENT.
APPLICATION FILED APR. 24, 1920.

1,378,547. Patented May 17, 1921.

Inventor
H. A. W. Klinkhamer
By H. R. Kerslake
Atty.

UNITED STATES PATENT OFFICE.

HENDRIK ABRAHAM WIJNAND KLINKHAMER, OF HENGELO, NETHERLANDS.

RESISTANCE MEASUREMENT.

1,378,547.  Specification of Letters Patent.  Patented May 17, 1921.

Application filed April 24, 1920. Serial No. 376,409.

*To all whom it may concern:*

Be it known that I, HENDRIK ABRAHAM WIJNAND KLINKHAMER, engineer, a subject of the Queen of the Netherlands, residing at Hengelo, the Netherlands, have invented certain new and useful Improvements in Resistance Measurements, of which the following is a specification.

The invention relates to improvements in apparatus and the electrical circuits thereof for the measurement of resistance.

The primary object of the invention is to provide for an apparatus of the character mentioned, and one wherein a direct reading of the measurement of resistance is obtained on a scale forming a part of the apparatus.

Another object of the invention is to provide for an apparatus of the type set forth, and one in the use of which, accurate direct readings are obtained with a minimum amount of current being utilized in the circuits of the apparatus and a wider range of constants or reduction factors are obtained than has heretofore been possible in the prior art.

A further object of the invention is to provide an apparatus of the kind mentioned, and one wherein the known resistance thereof may be varied throughout an extremely wide range from minimum to maximum, which minimum and maximum limits of range are dependent upon the maximum allowable current flowing through the circuits on the one hand and the sensibility of the measuring instrument used on the other hand.

With the foregoing and other objects in view, the invention resides in the certain novel arrangement of instruments and circuits as will be hereinafter more fully described, set forth in the appended claims, and illustrated in the accompanying drawings, in which:—

Figure 1:
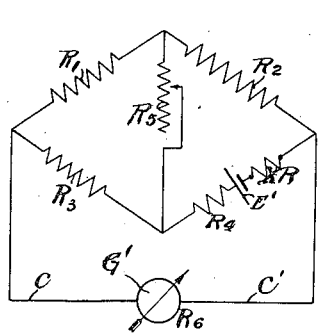
Figure 2:
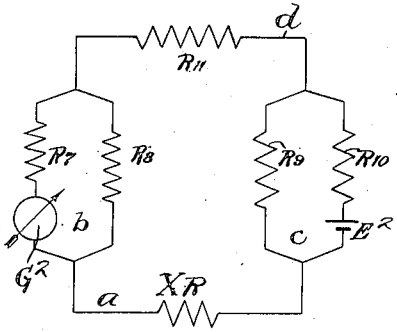
Figure 3:
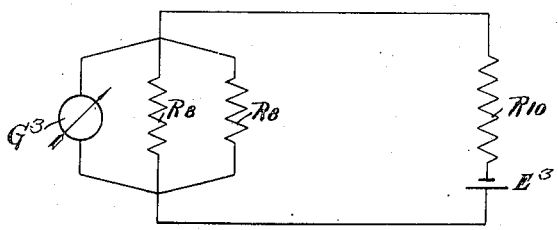
Figure 4:
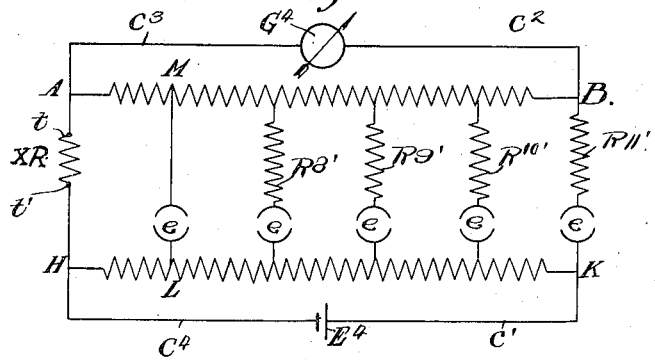

Figure 1 is a diagrammatical plan view of a known arrangement of circuits and instruments for the measurement of resistance, Fig. 2 is a diagrammatical plan view of one arrangement of circuits and instruments of the present invention, Fig. 3 is a modified arrangement of the form as shown in Fig. 2, and Fig. 4 is the preferred or practical form of the invention as distinguished from those in Figs. 2 and 3.

Referring to the drawing, and more particularly to Fig. 1 thereof, wherein is shown diagrammatically a simple "Wheatstone" bridge form of electrical apparatus for the measurement of resistance, the same consists of resistances $R_1$—$R_2$—$R_3$ and $R_4$, each having a fixed known value; a variable resistance $R_5$ interposed across the circuit between resistances $R_1$—$R_3$ on the one hand, and resistances $R_2$—$R_4$ on the other; a battery source of current supply $E^1$ and an unknown resistance XR interposed in the circuit between resistances $R_2$—$R_4$; and leads C—$C^1$ connecting a measuring instrument $G^1$ in shunt across the several arms of the resistance circuits. The battery $E^1$ is of a type having a constant E. M. F., and the instrument $G^1$ is an ammeter having a scale reading in ohms and from which the value of the resistance XR to be measured may be read directly.

In the use of this apparatus, the scale reading of the instrument $G^1$ must be multiplied by a scale constant obtained from the different adjustments of the variable resistance $R_5$, which constant or reduction factor, according to the general practice and rule, is a multiple of 10, *i. e.*, 1, 10, 100, 1000, etc.

In this apparatus, the relation between the current (I) flowing through the instrument $G^1$ and the unknown resistance XR across the measuring terminals is obtained from the equation:—

$$XR = R\frac{I_0 - I}{I} \quad (1)$$

wherein $I_0$ represents the current passing through the instrument $G^1$ when XR=$o$ and R, the total resistance of the bridge as measured across the terminals of the latter after the unknown resistance XR is taken away.

Correspondingly with the variation of $R_5$, the value of R varies also, and it is a feature of this arrangement that $I_0$ does not vary but is always equivalent to the current $I_v$ passing through the instrument $G^1$ at full deviation of its indicating pointer. Therefore, the relative value of XR to I is obtained in the equation:—

$$XR = R\frac{I_v - I}{I}$$

the constant R having different values, *i. e.*, 1, 10, 100, 1000, etc., correspondingly with the adjustment of $R_5$. When the numerical values of the fraction $\frac{I_v - I}{I}$ are indicated on the scale of the instrument at the positions of the indicating pointer thereof corresponding with I, these numerical indications must be multiplied with a constant R, which is dependent upon the variation of $R_5$ to find the value of XR, the unknown resistance to be measured. The value of R then is to be considered as the reduction factor of the apparatus, and the greater the range in variation of $R_5$, the greater will be the range of readings to be obtained on the instrument $G^1$, and it is, therefore, desirable to give to the resistance $R_5$ the greatest possible range of variation. The maximum degree of sensibility of the instrument $G^1$ is fixed by the maximum range of $R_5$, and the minimum degree of the same is fixed by the maximum value of the battery current.

In the form of the invention, as shown in Fig. 2, an arrangement of circuits is shown as consisting of a main circuit $a$ containing the resistance XR to be measured, having one leg connecting a branch or local circuit $b$ containing resistances $R_7$ and $R_8$ and an ammeter $G^2$ and the other leg a second branch or local circuit $c$ containing the resistances $R_9$ and $R_{10}$ and a battery $E^2$. The main circuit $a$ connects the circuit $b$ at a point between the instrument $G^2$ and the resistance $R_8$, and the circuit $c$ at a point between the battery $E^2$ and the resistance $R_9$, the other sides or branch of the main circuit containing the resistance $R_{11}$, as at $d$, connecting these circuits $b$ and $c$ at points between the resistances $R_7$ and $R_8$, and the resistances $R_9$ and $R_{10}$, respectively.

In this arrangement, when the total resistance of the main circuit is R without the resistance XR to be measured, then the relation between XR and I is again obtained from the equation:—

$$XR = R\frac{I_o - I}{I} \quad (2)$$

Now, by varying the arrangement, so that R, the constant or reduction factor, varies, the current passing through the instrument $G^2$ remains the same, when XR=o, as is indicated by the result obtained from the equation:—

$$I_o = \frac{E_2}{R} \cdot \frac{R_8}{R_7 + R_8} \cdot \frac{R_9}{R_9 + R_{10}}$$

and it is possible to use the same scale for different ranges, the reading, however, having to be multiplied correspondingly with the constant or reduction factor R obtained in each instance. Therefore, it is necessary to vary the resistances so as to make the following relation true in accordance with the equation:—

$$\frac{E_2}{R} \cdot \frac{R_8}{R_7 + R_8} \cdot \frac{R_9}{R_9 + R_{10}} = I_o \quad (3)$$

wherein $I_o$ represents the current of the instrument $G^2$ at full deviation.

This formula or equation for $I_o$ may be deduced, as follows:—

$$I = \frac{E^2}{\frac{(R_{11} + Z)R_9 + R_{10}}{Z + R_{11} + R_9}}$$

$$I_{x=o} = I\frac{R_9}{R_9 + R_{11} + Z},$$

in which $$Z = \frac{R_8 \cdot R_7}{R_7 + R_8}$$

and $$I_o = I_{x=o}\frac{R_8}{R_7 + R_8}.$$

With R, the total resistance between the terminals for measuring, then $$R = Z + R_{11} + \frac{R_9 \cdot R_{10}}{R_9 + R_{10}}$$

$$Z = R - R_{11} - \frac{R_9 \cdot R_{10}}{R_9 + R_{10}}$$

$$I_o = \frac{E_2}{\frac{(R_{11} + Z) + R_9}{Z + R_{11} + R_9}} + R_{10} \times \frac{R_9}{R_9 + R_{11} + Z} \times \frac{R_8}{R_7 + R_8}$$

$$I_o = \frac{E_2}{\frac{(R_{11} + Z)R_9 + R_{10}(Z + R_{11} + R_9)}{Z + R_{11} + R_9}} \cdot \frac{R_9}{R_9 + R_{11} + Z} \cdot \frac{R_8}{R_7 + R_8}$$

$$= \frac{E_2}{(R_{11} + Z)R_9 + R_{10}(Z + R_{11} + R_9)} \cdot \frac{R_9 R_8}{R_7 + R_8}$$

$$I_o = \frac{E_2}{R_9 R_{10} + RR_9 - \frac{R_9^2 R_{10} + RR_{10}}{R_9 + R_{10}} - \frac{R_9 R_{10}^2}{R_9 + R_{10}}} \cdot \frac{R_9 R_8}{R_7 + R_8}$$

$$I_o = \frac{E_2}{\frac{RR_9^2 + RR_9 R_{10} + RR_9 R_{10} + RR_{10}^2}{R_9 + R_{10}}} \cdot \frac{R_9 R_8}{R_7 + W_8}$$

$$I_o = \frac{E_2 R_9}{R(R_9 + R_{10})} \cdot \frac{R_8}{R_7 + R_8}$$

It will be readily obvious that, since the main circuits $a$ and $d$ being electrically coupled to the branch or local circuits $b$ and $c$, the greater the current flowing through the instrument or ammeter $G^2$, the same being the result of a certain current in the main circuit, the greater will be the degree of coupling effect between the circuits, i. e., a current $I$, in the main circuit will cause a current $$I_x = \frac{R_8}{R_7 + R_8}$$

flowing through the ammeter $G^2$. The fraction $$\frac{R_8}{R_7 + R_8}$$

may therefore be defined as the degree of coupling effect of the main circuit $a$—$d$ with the battery circuit $c$. When both the ammeter circuit $b$ and the battery circuit $c$ are connected in on the main circuit $a$—$d$, the relation is $$I_o = \frac{E_2}{R}.$$

However, with the ammeter and battery circuits $b$ and $c$ having both of their legs electrically coupled in on the main circuit, the value of $I_o$ is to be multiplied by any of the degrees of coupling of the main circuit with the branch or local circuits, as follows from the deduced formula or equation for $I_o$.

For proving that the whole range of the instrument or ammeter $G^2$, as in the present invention, is greater than with the known arrangements for measuring resistance such as is illustrated in Fig. 1 of the drawing, it is necessary to calculate the maximum of $R''$ and the minimum of $R'$ of the reduction factor for both cases, and also, to prove that certain things may be neglected or otherwise dispensed with for the sake of simplicity, the numerical values of a practical application of the arrangement as shown in Fig. 1 of the drawing is given, as follows, so as to better judge of the order of magnitude of the values:—$R_1 = R_3 = 198500$ ohms; $R_2 = R_4 = 150$ ohms; $I_o = 6.10^{-5}$ amperes. $E' = 12V$; $R_6 = r = 750$ ohms ($r$ being the resistance of the instrument or ammeter $G^1$). As an ammeter is used, the same being a very sensitive instrument of the pivoted suspension type of indicator such as is readily obtained in the market and of lower current consumption, it is assumed in the present instance, that the battery current does not exceed 40 milliamperes, therefore $I_b = 0.040$ amperes.

In the arrangement, Fig. 1, the battery current equals $\frac{E'}{R}$, when the maximum allowable battery current is designated $I_b$, the smallest possible value of allowable value of $R$, consequently:—

$$R' = \frac{E_1}{I_b} \quad (4)$$

$R$ is maximum, when $R_3 = \infty$, then $R_1 + R_2$ are connected in parallel with $R_6$. As may be seen from the values as given, $R_1 + R_2$ is very great in comparison with $R_6$ so any error or mistake made in the measurement will be very small or negligible, if the current through $R_1 + R_2$ is neglected as regards to the current passing through $R_6$. Then the battery current $\frac{E'}{R''}$ equals the current through the ammeter and this current equaling $I_v$, when $XR = o$, it is evident that $$R'' = \frac{E_1}{I_v} \quad (5)$$

In the arrangement shown in Fig. 2, $R$ is maximum when $R_8 = \infty$; $R_7 = r$ (the intrinsic resistance of the instrument $G^2$); and $R_{10} = o$. As the resistances must be chosen so as to satisfy the formulas for all measuring ranges, when $XR = o$, it is found, with regard to formula (3) that;—

$$R'' = \frac{E_2}{I_v} \quad (6)$$

A very small value $R'$ of the reduction factor may be obtained from $R_{11} = o$; $R_7 = r$ and $R_8 = R_9$; if $R_{10}$ has such a small value that the battery produces the maximum allowable current $I_b$.

If the measuring terminals of the arrangement of Fig. 2 are short-circuited, the arrangement as in Fig. 3 is obtained, in which case, the current $I_b$ branches into the ammeter $G^3$ with the resistance $r$ and the shunted branch resistance $R_8$. As before stated, the current flowing through any of the instruments or ammeter $G$ in each instance, must be $I_v$, when $XR = o$, which is to say in the case of Fig. 3, $R_8$ must be chosen so that—

$$\frac{I_v}{I_b} = \frac{\frac{1}{2}R_8}{\frac{1}{2}R_8 + r}$$

from which follows $$R_8 = \frac{2rI_v}{I_b - I_v}.$$

As in the example applying to practice $I_v : I_b = 6.10^{-5} : 40.10^{-3} = 0.0015$, it is evident that $I_v$ may be eliminated in regard to $I_b$, so that $R_8 = 2r\frac{I_v}{I_b}$, and since $R_{11} = o$, it is also evident with regard to Fig. 2, that, when the measuring terminals are short-circuited, the resistance of the main circuit is obtained from $R' < R_8 + R_9$, since, according to the above, $R_8 = R_9$ $$R' < .4r\frac{I_v}{I_b} \quad (7)$$

Considering that, in both the known arrangement (Fig. 1) and the arrangement according to the present invention, the same ammeter and the same measuring battery is used, $r$; $I_v$; $E$ and $I_b$ then have the same value in both cases, and consequently by using formulas (5) and (6), it is evident that the maximum reduction factor value is the same in both arrangements. It then follows that by using the formulas (4) and (7) the minimum reducing factor value, obtaining in the known arrangement Fig. 1, is reduced $\frac{E_1}{4rI_v}$ times in the arrangements of the present invention.

Designating the voltage sensibility of the ammeter as $E_v$, $E_v = r I_v$, so that the minimum reducing factor value is reduced $\frac{E}{4E_v}$ times.

In the example given herein, it was assumed that $E$ ($E^1$, $E^2$, $E^3$ or $E^4$) = 12 volts and $E_v = 750.6.10^{-5} = 0.045$ volts, and, therefore, the lowest limit of the reducing factor value, according to this invention is $12:4 \times 0.045 = 67$, i. e., the minimum reducing factor value being 67 times smaller than in the known arrangement.

In Fig. 4 of the drawing, wherein is shown a practical and preferred form of the invention, having 5 ranges, and the same consists of a main circuit including the battery $E_4$, conductor $c^1$ connecting one side of a split plug socket $e$, resistance $R_{11}'$, connecting the other side of the split socket $e$, conductor $c^2$ connecting the resistance $R_{11}'$, to one terminal of an ammeter $G^4$, conductor $c^3$ leading from the other terminal of the ammeter $G^4$ to a measuring terminal $t$, and a conductor $c^4$ leading from the other side of the battery $E^4$ to another measuring terminal $t^1$, between which terminals $t$ and $t^1$, the unknown resistance XR is connected. Extending in parallel to each other are a pair of resistances A—B and H—K, the resistance A—B being shunted around the ammeter $G^4$ and the resistance H—K around the battery $E^4$. Connecting the resistances A—B and H—K in series parallel are resistances $R_8'$, $R_9'$ and $R_{10}'$ and a short-circuit connection L—M, each resistance $R_8'$, $R_9'$ and $R_{10}'$ and the connection L—M having a split plug socket complemental thereto, each designated $e$.

In the apparatus, making use of the same ammeter and battery, as in the other examples herein given, as:—$G = 750$ $I_v = 6.10^{-5}$ $E = 12$ $I_b = 0.040$ and assuming resistance A—M—B to be 500 ohms, resistance H—L—K to be 320 ohms, and resistance A—M=H—L to be 4 ohms, it is possible to choose the ranges in such way that the relation of the reducing factors to be obtained are 1:10:100:1000:10000.

The range is chosen by plugging into one of the plug sockets, as is usual in instruments of this type, but the uppermost limit of a reducing factor is not reached by the simple changing over of a plug from one socket to another, and to obtain a periodical instrument or ammeter, the oscillations of the indicator of the latter are damped by reason of the resistance A—M—B being always connected across the terminals of the instrument or ammeter. The resistances in this preferred form of the invention may have any value, it being understood, however, that for all ranges, the condition of $I_o = I_v$ is fulfilled, and, consequently, some of the resistances may have a value $o$ or $\infty$.

Compensation for any decrease in battery voltage, and of any temperature influence may be provided for in any of the known apparatus of this character, as by using a small rheostat connected in series with the ammeter or with the battery.

In the development and design of an instrument according to the present invention, errors or mistakes occurring in the results of measurements made are so small as to be not perceptible, especially when the resistances are suitably and accurately chosen.

Having thus fully described the invention, what I claim is:—

1. An arrangement for the direct reading of electrical resistances comprising a main circuit including the resistance to be measured, a branch resistance circuit including an ammeter associated with said main circuit, a second branch resistance circuit including a source of current supply associated with said main circuit and said first mentioned branch circuit, and means for varying the resistance of said main circuit and the degree of coupling thereof with respect to said branch circuits, whereby different reduction factors are obtained for the same division of the scale of said ammeter.

2. An arrangement for the direct reading of electrical resistances comprising a main circuit including the resistance to be measured, a branch resistance circuit including an ammeter and associated with said main circuit, a second branch resistance circuit including a source of current supply and associated with said main circuit and said first mentioned branch circuit, the degree of coupling of one of said branch circuits with said main circuit being constant, and means for varying the resistance of said main circuit and the degree of coupling of the other of said branch circuits with respect thereto, whereby different reducing factors are obtained for the same division of the scale of said ammeter.

3. An arrangement for the direct reading of electrical resistances comprising a main circuit including the resistance to be measured, a branch resistance circuit including an ammeter and associated with said main circuit, a second branch resistance circuit including a source of current supply and associated with said main circuit and said first mentioned branch circuit, the resistance of one of said branch circuits being infinite and the degree of coupling of said branch circuit with said main circuit being constant, and means for varying the resistance of said main circuit and the degree of coupling of the other of said branch circuits with respect thereto, whereby different reducing factors are obtained for the same division of the scale of said ammeter.

4. An arrangement for the direct reading of electrical resistances comprising a main circuit including the resistance to be measured, a branch circuit including infinite resistance and an ammeter and having constant connection with said main circuit, a second branch resistance circuit including a source of current supply having constant E. M. F., associated with said main circuit and said first mentioned branch circuit, and means for varying the resistance of said main circuit and the degree of coupling of said last mentioned branch circuit with respect thereto, whereby different reducing factors are obtained for the same division of the scale of said ammeter.

5. An arrangement for the direct reading of electrical resistances comprising a main circuit including the resistance to be measured, a branch circuit including infinite resistance and a source of current supply having constant E. M. F., and having constant connection with said main circuit, a second branch resistance circuit including an ammeter associated with said main circuit and said first mentioned branch circuit, and means for varying the resistance of said main circuit and the degree of coupling of said last mentioned branch circuit with respect thereto, whereby different reducing factors are obtained for the same division of the scale of said ammeter.

In testimony whereof I affix my signature.

HENDRIK ABRAHAM WIJNAND KLINKHAMER.